(12) United States Patent
Estival et al.

(10) Patent No.: US 10,908,305 B2
(45) Date of Patent: Feb. 2, 2021

(54) METHOD FOR EVALUATING A GEOPHYSICAL SURVEY ACQUISITION GEOMETRY OVER A REGION OF INTEREST, RELATED PROCESS, SYSTEM AND COMPUTER PROGRAM PRODUCT

(71) Applicant: TOTAL SA, Courbevoie (FR)

(72) Inventors: Rémi Estival, Pau (FR); Jean-Luc Boelle, Pau (FR); Peigen Xie, Pau (FR); Jean-Baptiste Laffitte, Pau (FR); Henri Puntous, Pau (FR); Francis Clément, Pau (FR); Paul Barbier, Pau (FR)

(73) Assignee: TOTAL SA, Courbevoie (FR)

( * ) Notice: Subject to any disclaimer, the term of this patent is extended or adjusted under 35 U.S.C. 154(b) by 353 days.

(21) Appl. No.: 16/001,382

(22) Filed: Jun. 6, 2018

(65) Prior Publication Data
US 2018/0356544 A1 Dec. 13, 2018

(30) Foreign Application Priority Data

Jun. 8, 2017 (EP) ..................................... 17305686

(51) Int. Cl.
*G01V 1/00* (2006.01)
*G01V 1/30* (2006.01)
*G06K 9/32* (2006.01)

(52) U.S. Cl.
CPC .............. *G01V 1/003* (2013.01); *G01V 1/302* (2013.01); *G06K 9/3233* (2013.01);
(Continued)

(58) Field of Classification Search
CPC ..................................................... G01V 1/003
See application file for complete search history.

(56) References Cited

U.S. PATENT DOCUMENTS

2003/0050759 A1* 3/2003 Srnka ..................... G01V 3/083
702/7
2010/0042391 A1 2/2010 Shin
(Continued)

FOREIGN PATENT DOCUMENTS

| CN | 102116869 A | 7/2011 |
| EP | 2787372 A2 | 10/2014 |

(Continued)

*Primary Examiner* — Manuel A Rivera Vargas
(74) *Attorney, Agent, or Firm* — Troutman Pepper Hamilton Sanders LLP

(57) ABSTRACT

The invention concerns a method for evaluating a geophysical survey acquisition geometry over a region of interest. The method comprises determining a location of a plurality of base camps in respect of a determined minimal surface density of base camps, determining a first set of locations of a plurality of receivers in respect of a determined minimal surface density of receivers, generating a first synthetic geophysical dataset based on the first geophysical survey acquisition geometry, processing the first synthetic geophysical dataset for obtaining a first simulated image of the subsurface of the region of interest using a geophysical processing algorithm and an a priori subsurface model, and calculating a first objective function dependent of at least a first quality index of the first simulated image of the subsurface of the region of interest.

22 Claims, 5 Drawing Sheets

(52) U.S. Cl.
CPC .... *G01V 2200/14* (2013.01); *G01V 2210/612* (2013.01); *G01V 2210/614* (2013.01); *G01V 2210/6161* (2013.01)

(56) References Cited

U.S. PATENT DOCUMENTS

| | | | |
|---|---|---|---|
| 2010/0322032 A1 | 12/2010 | Shin | |
| 2012/0316792 A1 | 12/2012 | Liu et al. | |
| 2013/0223187 A1* | 8/2013 | Thapar | G01V 1/345 367/73 |
| 2013/0294196 A1 | 11/2013 | Childs et al. | |
| 2014/0278289 A1* | 9/2014 | Etgen | G01V 99/005 703/2 |
| 2016/0025878 A1 | 1/2016 | Shin | |
| 2016/0047924 A1 | 2/2016 | Anderson | |
| 2016/0061974 A1 | 3/2016 | Bansal | |
| 2017/0212260 A1* | 7/2017 | Padhi | G01V 1/306 |
| 2020/0081145 A1* | 3/2020 | Padhi | G01V 1/50 |

FOREIGN PATENT DOCUMENTS

| | | |
|---|---|---|
| GB | 2504158 A | 1/2014 |
| KR | 20090116598 A | 11/2009 |
| WO | 200129577 A1 | 4/2001 |
| WO | 200309005 A1 | 1/2003 |
| WO | 200701746 A1 | 1/2007 |
| WO | 2017100746 A1 | 1/2007 |
| WO | 2009136708 A1 | 11/2009 |
| WO | 2011100077 A1 | 8/2011 |
| WO | 2011123197 A1 | 10/2011 |
| WO | 201247378 A1 | 4/2012 |
| WO | 201274592 A1 | 6/2012 |
| WO | 201274612 A1 | 6/2012 |
| WO | 2012166228 A1 | 12/2012 |
| WO | 201393468 A2 | 6/2013 |
| WO | 2013119598 A2 | 8/2013 |
| WO | 2013133912 A1 | 9/2013 |
| WO | 2014204440 A1 | 12/2014 |
| WO | 201573487 A1 | 5/2015 |
| WO | 2015159151 A1 | 10/2015 |
| WO | 201665247 A1 | 4/2016 |
| WO | 2016133561 A1 | 8/2016 |
| WO | 2016193180 A1 | 12/2016 |
| WO | 2017105954 A1 | 6/2017 |

* cited by examiner

METHOD FOR EVALUATING A GEOPHYSICAL SURVEY ACQUISITION GEOMETRY OVER A REGION OF INTEREST, RELATED PROCESS, SYSTEM AND COMPUTER PROGRAM PRODUCT

CROSS-REFERENCE TO RELATED APPLICATIONS

The present application claims priority from European Patent Application No. 17305686.2 filed on Jun. 8, 2017, the entire contents of which are hereby incorporated by reference.

FIELD OF TECHNOLOGY

The present invention concerns a method for evaluating a geophysical survey acquisition geometry over a region of interest.

BACKGROUND

The region of interest is notably a region with a difficult access. The region in particular comprises a high density of vegetation, such as a forest, in particular a tropical forest. Also, the region may comprise rugged terrain such as hills (for example foothills), cliffs and/or mountains. Also, the region may comprise dangerous to access areas, such as areas with unexploded ordinances (UXOs).

The method can also be applied to any region of interest.

The geophysical survey is for example a magnetotelluric survey, a passive seismic survey or an active seismic survey.

In the following, the expression "seismic survey" refers to an active seismic survey.

The seismic survey acquisition is one of the main geophysical methods carried out for exploration in oil and gas industry. The geophysical measurements obtained during such a survey are critical in building a subsurface image representative of the geology of the region of interest, in particular to determine the location of potential reservoirs of oil and gas.

Such seismic survey is for example conducted by deploying seismic sources and seismic receivers, such as geophones, on the ground of the region of interest. The seismic receivers are able to record mainly the reflections of the seismic waves produced by the sources on the different layers of the earth in order to build an image of the subsurface.

The seismic survey generally requires sources and a large amount of receivers in the ground at various locations, along generally several profiles to create dense arrays of sources and receivers.

Placing sources and sensors in a remote region of interest may be a tedious, dangerous and expensive process. In particular, when the region is barely accessible, such as in a tropical forest and/or in a region with uneven terrain and/or in a region with UXOs, the sources and the receivers have to be carried at least partially by foot by teams of operators. In many cases, clearings have to be opened in the forest to place on the ground the relevant equipment and operators. Trails must then be cleared in the forest to put in place the receivers.

These tasks create a strong environmental impact in the region of interest and may induce significant health and safety risks for the operators.

The quality of the subsurface image obtained after the processing of the seismic survey data is generally a function of the surface density of sources and/or of receivers. In particular, a significant number of receivers have to be put in place in the ground to obtain an image of good quality. This is in particularly the case when a three-dimensional image is required.

Classically, the acquisition geometry of a seismic survey, i.e. the relative location of the receivers and/or of the sources, is defined according to a regular grid, for example based on a rule of thumb mainly depending on the depth of the target.

For imaging simple geological structures, such as quasi 2D structures, in planned areas, these basic rules lead to satisfactory results.

However, for complex 3D geological structures and rugged terrains such as those mentioned above, these rules are often not fulfilled as they yield huge openings and high cost, as a consequence it may lead to obtain a bad image of the ground subsurface.

SUMMARY

One aim of the invention is to provide an efficient method for evaluating a seismic survey acquisition geometry which provides a good quality image of the subsurface.

To this aim, the subject-matter of the invention is a method for evaluating a geophysical survey acquisition geometry over a region of interest, said acquisition geometry specifying at least a location of a plurality of receivers, said method comprising:
determining a location of a plurality of base camps in respect of a determined minimal surface density of base camps over the region of interest,
determining a first set of locations of a plurality of receivers in respect of a determined minimal surface density of receivers over the region of interest,
generating a first synthetic geophysical dataset based on the first geophysical survey acquisition geometry,
processing the first synthetic geophysical dataset for obtaining a first simulated image of the subsurface of the region of interest using a geophysical processing algorithm and an a priori subsurface model of the region of interest,
calculating a first objective function, said first objective function being dependent of at least a first quality index of the first simulated image of the subsurface of the region of interest.

The method according to the invention may comprise one or more of the following features, taken solely or according to any potential technical combination:
the method further comprises:
determining a second set of location of a plurality of receivers in respect of the determined minimal surface density of receivers over the region of interest,
generating a second synthetic geophysical dataset based on the second geophysical survey acquisition geometry,
processing the second synthetic geophysical dataset for obtaining a second simulated image of the subsurface of the region of interest using the geophysical processing algorithm and an a priori subsurface model of the region of interest,
calculating a second objective function, said second objective function being dependent of at least a second quality index of the second simulated image of the subsurface of the region of interest,
comparing the first objective function and the second objective function, determining an optimal set of locations of the receivers among the first set and the second set of locations of the receivers based on the comparison of the first and the second objective function, the second set of locations of the plurality of receivers is obtained by changing the location of at least one receiver of the first set of locations of the plurality of receivers, and advantageously by keeping the location of at least one receiver of the first set of locations of the plurality of receivers, the method further comprises determining an optimal sequence of logistical operations to install the receivers at the optimal set of locations and advantageously displaying on a displaying unit the corresponding sequence of logistical operations, the objective function is further dependent of at least one characteristic index of the geophysical survey acquisition geometry, the at least one characteristic index is calculated from at least one parameter among: a time for establishing the geophysical survey acquisition geometry, a total traveled distance for establishing the geophysical survey acquisition geometry, a mileage of opened trails for establishing the geophysical survey acquisition geometry, a volume of cut wood for establishing the geophysical survey acquisition geometry, a man-hour quantity for establishing the geophysical survey acquisition geometry, a fuel consumption quantity for establishing the geophysical survey acquisition geometry, a mileage of bridging for improving the accessibility of the region of interest, a number of helicopter hours for establishing the geophysical survey acquisition geometry, a generated $CO_2$ quantity for establishing the geophysical survey acquisition geometry, a total time for installing the receivers in the area of interest, the method further comprises a step for modifying the location of at least one base camp based on at least the optimal location of the receivers, the method further comprises a prior step for determining the determined minimal surface density of receivers based on a priori model modelling, the determination of the location of the plurality of base camps on the region of interest is based on a maximal characteristic distance traveled by a team of operators in a given time, the maximal characteristic distance being advantageously calculated from at least one field parameter of the region of interest chosen among: a topography, a vegetation density index, a vegetation nature index, a hydrographic network, a tracks location, the location of the plurality of receivers is calculated based on at least one field parameter of the region of interest, the field parameter being advantageously the vegetation density index and/or the vegetation nature index, and the location of the receivers is calculated in areas having locally a low and/or a null vegetation density index, and/or in areas having a predetermined vegetation nature index, at least one field parameter is determined from satellite and/or airborne measurements of the region of interest, the geophysical survey is a seismic survey, the acquisition geometry further specifying a location of a plurality of sources, the first and/or the second synthetic geophysical datasets being respectively a first and/or a second synthetic seismic datasets, the processing geophysical algorithm being a seismic imaging algorithm, the method further comprising after the step for determining the location of the plurality of base camps:

determining a first set of locations of a plurality of sources in respect of a determined minimal surface density of sources over the region of interest, the location of the sources being reachable on the ground from at least one base camp, the method further comprises before the step for determining the second set of location of a plurality of receivers:

a step for determining a second set of locations of a plurality of sources in respect of the determined minimal surface density of sources over the region of interest, the location of the sources being reachable from at least one base camp, the determining step further comprising determining an optimal set of locations of the sources, the second set of locations of the plurality of sources is obtained by changing the location of at least one source of the first set of locations of the plurality of sources, and advantageously by keeping the location of at least one source of the first set of locations of the plurality of sources, the seismic imaging algorithm is an illumination algorithm or a 3D seismic inversion and migration algorithm, the method further comprises a prior step for determining the determined minimal surface density of sources and/or the determined minimal surface density of receivers based on a priori model modelling, the a priori model modelling being advantageously obtained with an illumination algorithm.

the second set of locations of the plurality of receivers is obtained by changing the location of at least one receiver of the first set of locations of the plurality of receivers, and advantageously by keeping the location of at least one receiver of the first set of locations of the plurality of receivers.

the at least one characteristic index is calculated from a total time for installing the sources and the receivers in the area of interest;

the method comprises determining an optimal sequence of logistical operations to install the receivers and/or the sources at the optimal set of locations and advantageously displaying on a displaying unit the corresponding sequence of logistical operations.

the method comprises a step for modifying the location of at least one base camp based on the optimal location of sources and/or the optimal location of the receivers.

the location of the plurality of sources and/or the location of the plurality of receivers are calculated based on at least one field parameter of the region of interest.

The method according to the invention is implemented by a computer. In particular, all the steps of the method are carried out by a processor of the computer.

The invention further concerns a process for carrying out a seismic survey over a region of interest comprising:

carrying out a method as defined above to determine the location of a plurality of sources and the location of a plurality of receivers in the region of interest, based on the objective function, transporting the sources and the receivers to the base camps by at least a vehicle, carrying the sources at their determined locations, advantageously without a ground vehicle, and setting up the sources, transporting the receivers at their determined locations, in particular with a plurality of airborne platforms, the method advantageously comprising dropping the receivers in the ground from the airborne platforms.

The invention further concerns a system for evaluating a geophysical survey acquisition over a region of interest comprising:
- a base camp location calculating module for determining a location of a plurality of base camps on the region of interest,
- a receiver location calculating module for determining a first set of locations of a plurality of receivers in respect of a minimal surface density of receivers over the region of interest,
- a computation module for generating a synthetic geophysical dataset based on the geophysical survey acquisition geometry and an a priori subsurface model of the region of interest,
- an imaging module for processing the synthetic geophysical dataset for obtaining a simulated image of the subsurface of the region of interest using a geophysical processing algorithm,
- an objective function calculation module for calculating an objective function, said objective function being dependent of at least a quality index of the simulated image of the subsurface of the region of interest.

The system according to the invention may comprise the following features:
- the system further comprises:
  - a comparison module for comparing a first objective function resulting from a first geophysical survey acquisition geometry and a second objective function resulting from a second geophysical survey acquisition geometry,
  - an optimization module for determining an optimal set of locations of receivers among a first set of locations of a plurality of receivers of the first seismic survey acquisition geometry and a second set of locations of a plurality of receivers of the second seismic survey acquisition geometry, said optimal set of locations being based on the comparison of the first and the second objective function,
- the system further comprises a source location calculating module for determining a first set of locations of a plurality of sources in respect of a minimal surface density of sources over the region of interest, the location of the sources being reachable from at least one base camp, the geophysical survey being a seismic survey, the acquisition geometry further specifying a location of a plurality of sources, the synthetic geophysical dataset being a synthetic seismic dataset, the processing geophysical algorithm being a seismic imaging algorithm,
- the optimization module further determines an optimal set of locations of sources among a first set of locations of a plurality of sources of the first seismic survey acquisition geometry and at least a second set of locations of a plurality of sources of the second seismic survey acquisition geometry.

Finally, the invention further concerns a computer program product comprising software instructions which, when executed by a computer, carry out the method described above.

BRIEF DESCRIPTION OF THE DRAWINGS

The invention will be better understood, based on the following description, given solely as an example, and made in reference to the following drawings, in which.

DETAILED DESCRIPTION

Figure 1:
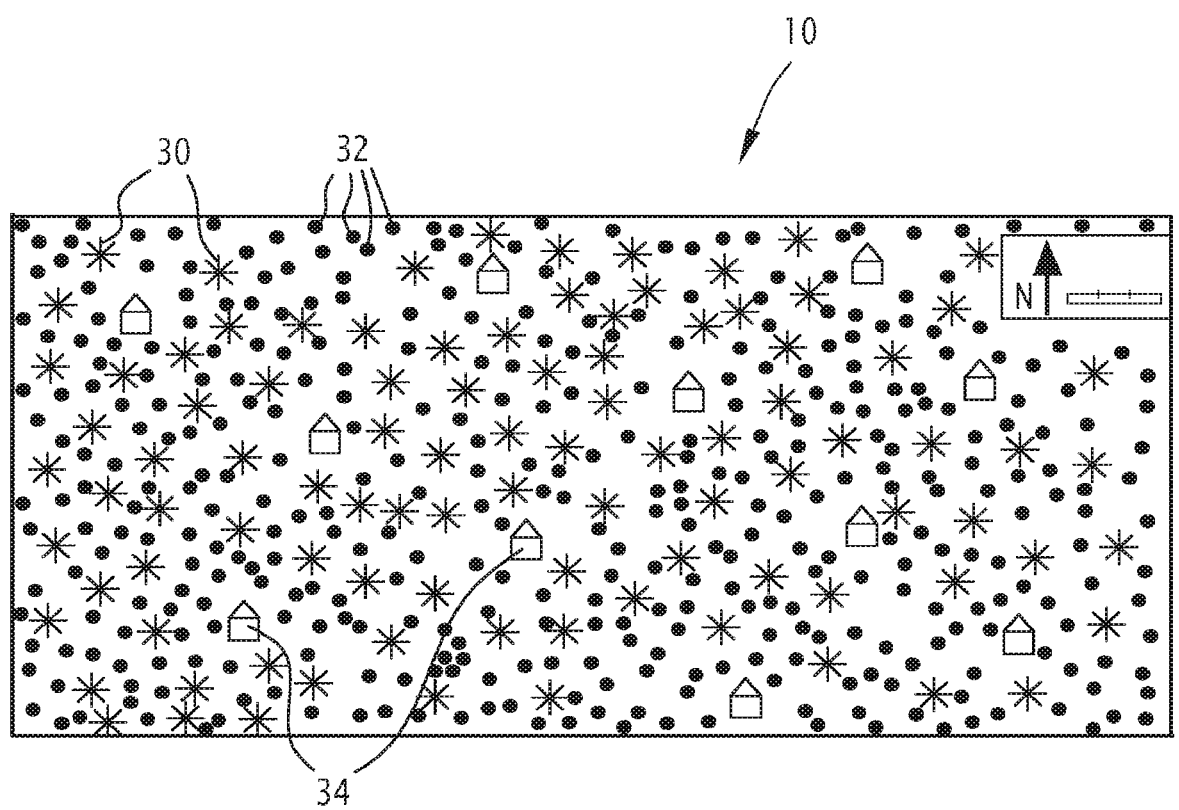
FIG. 1 is a schematic geographical view of a region of interest for which the seismic survey acquisition geometry is evaluated by the method according to the invention.
Figure 2:
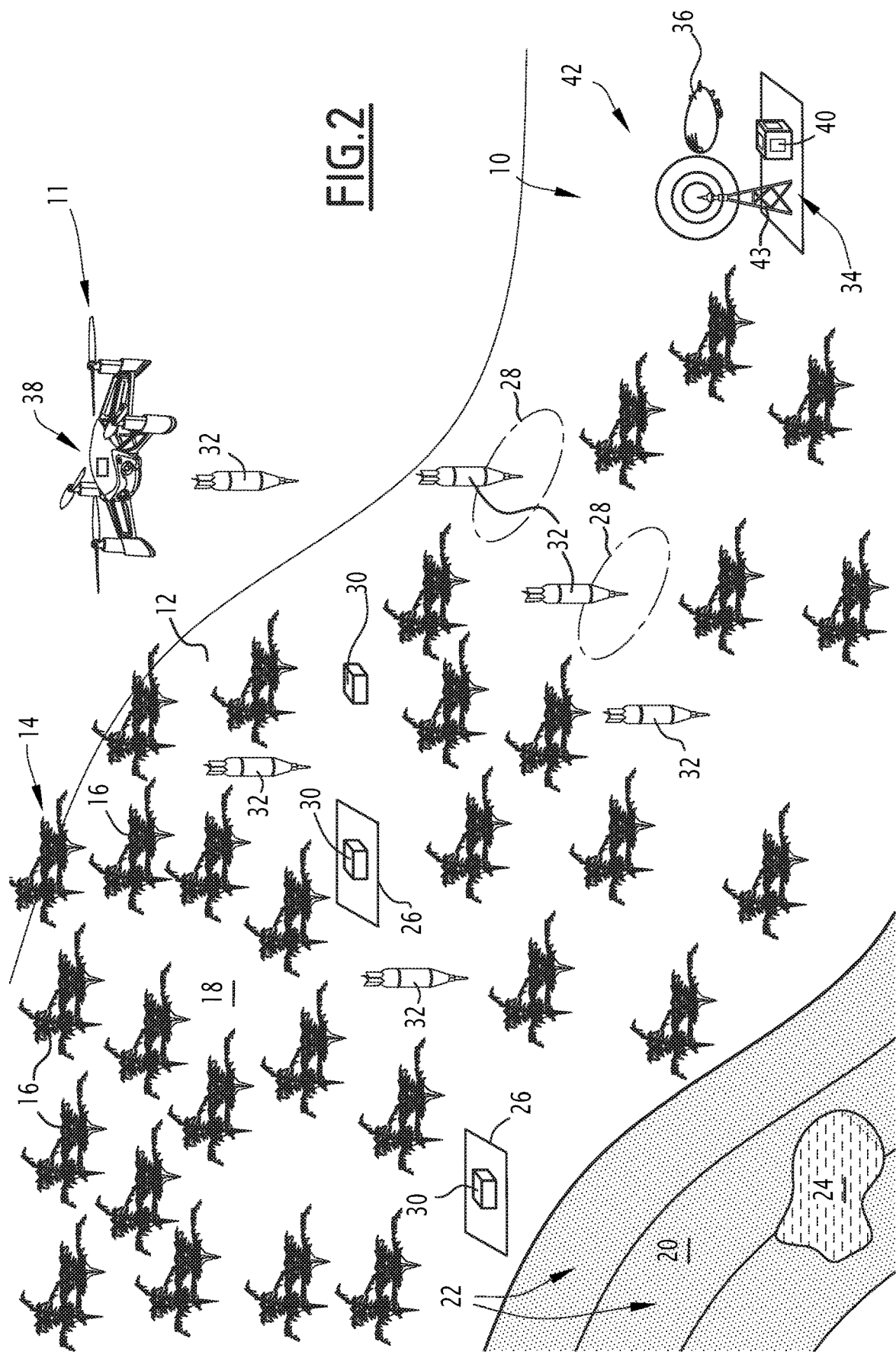
FIG. 2 is a schematic three-dimensional view of a part of the region of interest of FIG. 1.

FIGS. 1 and 2 show respectively a schematic geographical map of projected coordinates of a region of interest 10 where a seismic survey acquisition is carried out and a three dimensional view of a part of the region of interest 10.

The region of interest 10 is for example a region having an uneven terrain 12. The uneven terrain 12 in particular comprises hills, mountains, cliffs or any type of rugged terrain. The region of interest 10 is for example located on foothills which are difficult to access.

The region of interest 10 further comprises vegetation 14. The vegetation 14 is for example a forest, in particular a tropical forest. It comprises a high density of vegetation 14, for example trees 16 forming a canopy 18 which covers a majority of the surface of the ground in the region of interest 10.

The subsurface 20 located below the ground comprises layers of geological formation 22 and potentially oil and gas reservoirs 24.

In the region of interest 10, the vegetation 14 defines a plurality of natural and/or artificial clearings 26. The vegetation 14 in the region of interest 10 also defines sky holes 28 in the canopy 18.

The clearings 26 are spread in the region of interest 10, at a distance generally comprised between 100 m and 500 m, preferentially 300 m, taken along the line of sight between two adjacent clearings.

The clearings 26 generally have a surface area greater than 25 m$^2$ at the ground level and generally greater than 900 m$^2$ at the top of the canopy 18. The seismic sources 30 can be put in place in the clearings 26.

A clearing 26 is for example defined in a OGP Standard "OGP-Helicopter Guideline for Land Seismic and Helirig operations—Report 420 version 1.1 Jun. 2013.

Sky holes 28 are generally natural. They advantageously form a vertical "light tube" between the canopy 18 and the ground.

For example, the sky holes 28 have a minimal surface area greater than 1 m$^2$, preferentially greater than 3 m$^2$, and comprised for example between 3 m$^2$ and 20 m$^2$.

At least a sky hole 28 has a surface area which is smaller than the surface area of the clearings 26.

The method according to the invention is applicable for different types of geophysical surveys, such as magnetotelluric survey, passive seismic survey or active seismic survey.

In the following description, the expression "seismic survey" refers to an active seismic survey.

The seismic survey is a geophysical survey which comprises collecting geophysical measurements for determining physical properties of the subsurface 20 located in the region of interest 10 and/or for building an image of the subsurface 20, preferably a tridimensional image of the subsurface 20 based on the processing the collected measurements.

The physical properties are typically the density and/or the wave velocities of the layers of geological formation 22.

Typically, the seismic survey comprises installing a plurality of sources 30 and a plurality of receivers 32 in the region of interest 10 according to a seismic survey acquisition geometry.

The seismic survey acquisition geometry specifies the location of the sources 30 and of the receivers 32 in the region of interest 10.

Each source 30 is able to generate waves which propagate in the subsurface 20 and reflect at the interfaces of the layers of geological formation 22.

The source 30 for example comprises an explosive, in particular dynamite, able to generate waves in the ground.

The source 30 is typically inserted in a hole drilled into the ground, for example at a depth comprised between 0 meter and 100 meters, preferably between 5 meters and 80 meters.

For example, the hole is drilled using an unmanned ground vehicle such as a semi-automatic drilling platform.

In a variant, the source 30 comprises a mechanical device such as a hammer, a vibrator . . . .

The density of source 30 locations laid in the region of interest 14 is generally comprised between 10 source locations per $km^2$ and 100 source locations per $km^2$. Each source location can comprise one or more source 30.

In the example of FIG. 2, each source 30 is preferably arranged in a clearing 26 or located in the vicinity of the clearing 26.

Advantageously, several sources 30 are arranged in a clearing 26 or in the vicinity of the clearing 26.

Each source 30 is preferably carried at their locations without a ground vehicle from a base camp 34.

For example, at least a part of the source 30 is carried at its location using an airborne vehicle 36 such an airship or a helicopter, or an unmanned ground vehicle (UGV).

In a variant or in addition, at least a part of the source 30 is carried at its location by foot by a team of operators.

Each receiver 32 is able to record the waves generated by each source 30 and the reflected waves at the interfaces of the layers of geological formation 22.

The receiver 32 is for example a geophone able to measure the velocity of the direct and reflected waves.

Advantageously, the receiver 32 comprises at least one geophone, in particular three geophones and/or an accelerometer.

Each receiver 32 is partially introduced in the ground so as to ensure a good coupling with the ground.

In the example of FIG. 2, the receivers 32 are transported to their locations and dropped from airborne platforms 38.

Typically, the receivers 32 freefall until they impact with ground and pierce the ground, staying in place ready to record source signals.

In a variant, the receivers 32 can be launched toward the ground. The launching impulse can be obtained by the integration of a thruster (ex: pyrotechnic, turbine, propeller . . . ) in the receiver, or by the use of a propulsion mechanism onboard the airborne platform 38 (e.g. launching actuator or the decompression of a spring). The impulse accelerates the fall of the receiver 32 to help it penetrate further into the canopy and/or the ground.

In yet another variant, the fall of the receiver 32 can be slowed down by a braking mechanism (e.g. a parachute attached to the rear closing part). Slowing down the fall of the receiver 32 can for instance avoid damages to the receiver 32.

The airborne platforms 38 typically take off from a base camp 34.

For example, the airborne platform 38 is a UAV (for Unmanned Aerial Vehicle).

Each receiver 32 has for example the shape of a dart adapted to be introduced in the ground. In a variant, the receivers 32 have the shape of a ball or/and a parallel pipe shape.

The sources 30 and the receivers 32 are for example transported to the base camps 34 using a vehicle such as a ground vehicle, e.g. a truck, an unmanned ground vehicle (UGV) or an airborne vehicle, e.g. a helicopter.

Typically, the density of receivers 32 is for example between 10 receivers 32 per $km^2$ and 1000 receivers 32 per $km^2$, in particular between 300 receivers 32 per $km^2$ and 500 receivers 32 per $km^2$, notably 400 receivers 32 per $km^2$.

The method according to the invention is carried out before installing each source 30 and each receiver 32 and advantageously before determining the location of each base camp 34 in the region of interest. It aims at determining the optimal location for each source 30, each receiver 32 and each base camp 34.

The method for evaluating a seismic survey acquisition geometry comprises a first step 200 for determining a location of a plurality of base camps 34 on the region of interest 10.

Each base camp 34 comprises for example facilities adapted to house operators during the seismic survey and equipment for the seismic survey. The base camp 34 comprises a helipad and is typically used for management of the take-off and the landing.

The base camp 34 may be used for first aid (e.g. medevac).

Each base camp 34 typically comprises a collection and/or analysis unit 40 and a telecommunication system 42 able to transfer data measured by the receivers 32 to the collection and/or analysis unit 40 40 and from the collection and/or analysis unit 40 to an external station (not shown).

The external station may be located at a main camp (not shown). The main camp advantageously comprises facilities for collecting data, as well as a main computing unit, and/or a control center.

Typically, the location of each base camp 34 is determined based on the constraints imposed by the helipad. For example, the helipad must respect the OGP Standard mentioned above.

For example, the helipad has a size of 150 m×50 m.

Typically, the size can be reduced for example if the helipad is located at the top of a hill.

The distance between two helipads is typically comprised between 2 km and 10 km, for example 3.6 km.

Advantageously, the determination of the location of the plurality of base camps 34 on the region of interest 10 is based on a maximal characteristic distance traveled by a team of operators in a given time from a specific base camp 34 location.

In variant or in addition, the location of the plurality of base camps 34 is determined so as each base camp 34 is accessible from at least one other base camp 34 in the given time.

Typically, the location of the plurality of base camps 34 is determined so as each base camp 34 is able to radio communicate with all the other base camps 34.

Advantageously, the position and the number of base camps is optimized to make sure that more than 50% advantageously more than 80% and preferably 100% of the region of interest 10 is reachable from at least one base camp 34 in the given time.

Additionally, any location of clearings 26 and hence, of sources 30, is reachable from at least one base camp 34 in the given time.

For example, the given time is comprised between one hour and five hours, typically three hours.

Advantageously, the given time is chosen so as to allow the team of operators to make the return trip to the base camp 34 in the same working day.

The method preferentially comprises defining a set of base camp 34 positions, determining a reachable area 44 attainable in the given time, for example by determining a maximal characteristic distance in every direction from the base camp 34 position, and determining a coverage of the region of interest 10 by the reachable area 44.

Potentially, the method comprises moving at least area base camp 34 position to maximize the surface coverage while minimizing the overlap.

Figure 4:
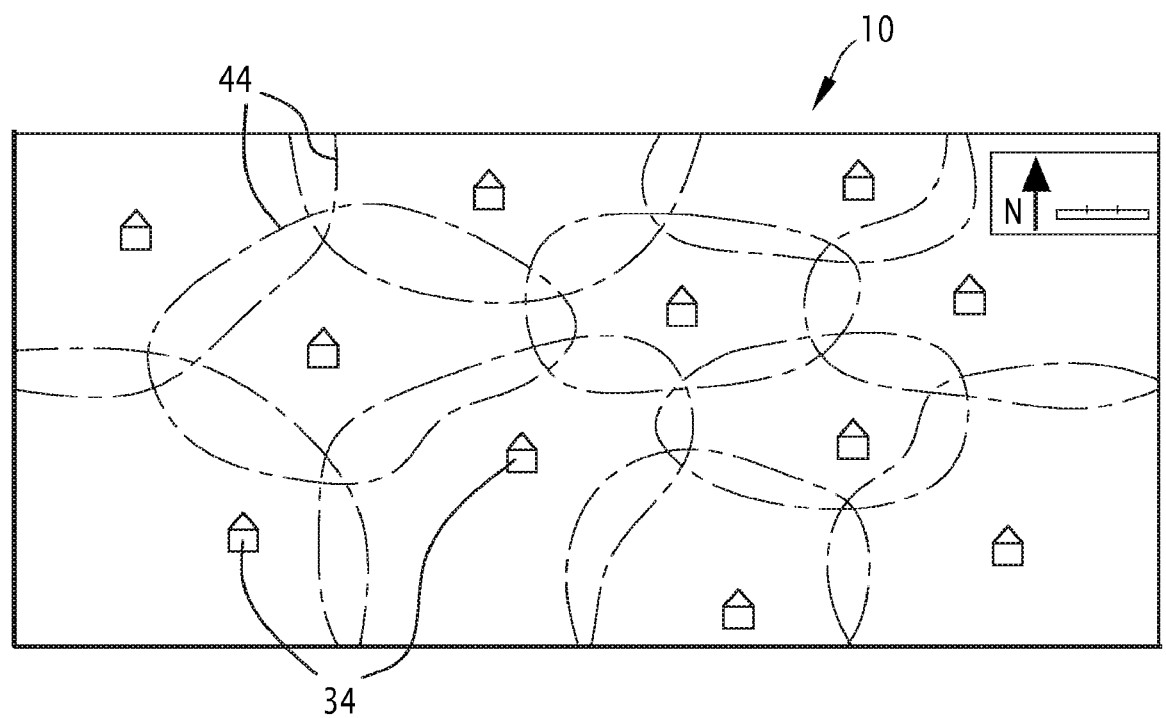
FIG. 4 is schematic geographical view of the region of interest of FIG. 1, showing the location of the base camps and corresponding areas of the region of interest reachable by foot from each base camp.

FIG. 4 shows the reachable area 44 from each base camp 34, based on the maximal characteristic distance traveled by the team of operators in each direction from the base camp 34.

The maximal characteristic distance in each direction is calculated from at least one field parameter of the region of interest 10.

For example, the maximal characteristic distance is the foot distance which can be traveled by the team of operators in the given time period depending on at least one field parameter, while advantageously respecting health and safety constraints.

The field parameter comprises for example a topography and/or a hydrographic network of the region of interest.

The field parameter comprises for example a tracks location map of existing tracks or of opened tracks and calculated optimal tracks to open in the vegetation 14.

For example, the calculated optimal tracks are determined based on the classification of satellite datasets providing for example information on the topography and on the vegetation to obtain maps reflecting the difficulty to travel in the region of interest 10.

Typically, the optimal tracks comprise several orders of optimal tracks such as main tracks, secondary tracks or tertiary tracks.

Typically, the difficulty to travel along the optimal track increases with the order of the optimal track.

For example, the region of interest 10 comprises a plurality of main tracks which allow moving in the main parts of the region of interest 10 and a plurality of secondary tracks which allow moving to different subparts of each main part and finally tertiary tracks which allow an access to a clearing 26.

Typically, the number and the length of each optimal track are optimized such as to minimize the length of travel and maximize the speed of travel in the region of interest 10.

The maximal characteristic distance is for example dependent on the local slopes in the region of interest 10, the presence of foothills and/or of cliffs, or other rugged topography features defined by the topography and/or the hydrographic network.

The maximal characteristic distance is for example dependent on the presence of creeks, and also ridges/crests of valleys in the hydrographic network.

The field parameter also advantageously comprises a vegetation density index and/or a vegetation nature index, which characterize the density and/or the nature of vegetation along a defined path.

Advantageously, the field parameter is determined from satellite and/or airborne measurements of the region of interest 10.

Advantageously, the field parameter is validated by field data or field observation and eventually updated.

For example, the vegetation density index and/or the vegetation nature index is/are determined from aerial photographs.

In a variant, the vegetation density index and/or the vegetation nature index is/are determined using spectral remote sensing data and spectral remote sensing data in combination with a digital surface model.

In another variant or in addition, the density index and/or the vegetation nature index is determined using airborne laser scanning methods such as Lidar surveys.

The topographic variations of the ground of the area of interest 10 may be determined for example by processing airborne photographs or satellite data coupled with calibration stations on the ground.

In a variant and in addition, the topographic variations of the ground are determined from a Lidar survey.

Advantageously, the location of a plurality of base camps 34 on the region of interest 10 is also determined based on health, safety and environment (HSE) constraints.

For example, the location of the base camps 34 is determined taking into account hazards such as flood possibility and/or landslide hazards, and/or dead tree fall risk.

For example, a map of areas comprising the hazards is defined and a minimal passage in the defined areas comprising hazards is calculated.

Advantageously, the location of the base camps 34 is also determined based on a minimization of the impact on local environment such as for example by minimizing the deforestation.

Typically, the HSE constraints are determined based on satellite and/or airborne geophysical data, such as remote sensing data and may include at least parameters such as tree density, tree health, elevated ground, proximity to water source, accessibility by foot to and from work areas such as clearings 26.

Figure 3:
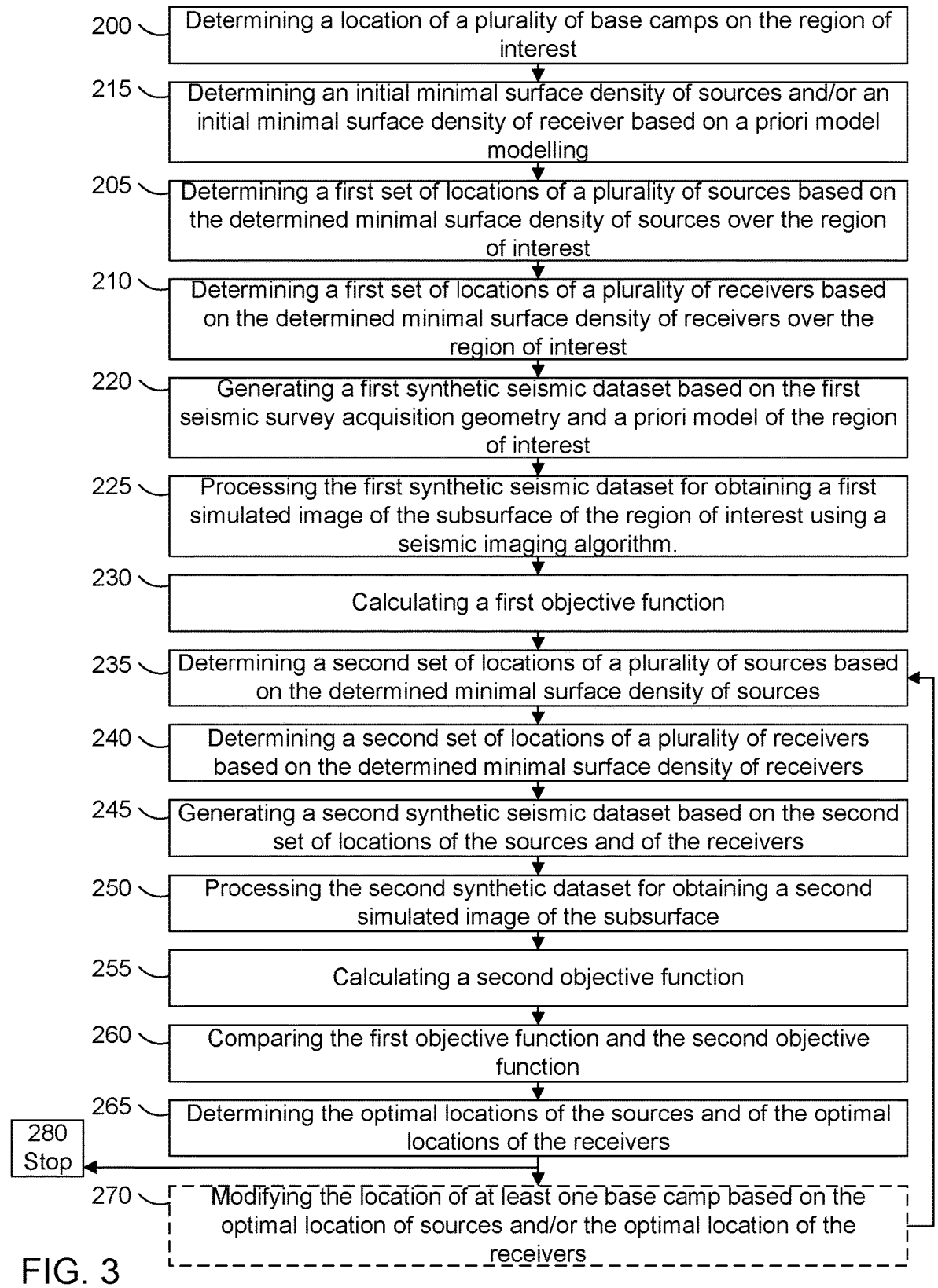
FIG. 3 is a flow chart of a method for evaluating a seismic survey acquisition geometry over a region of interest.

Once the location of the base camp 34 is predetermined, the method further advantageously comprises an initial step 215 for determining an initial minimal surface density of sources 30 and/or an initial minimal surface density of receivers 32 based on a priori model modelling, advantageously obtained with an illumination algorithm (FIG. 3).

The determined minimal surface density of sources 30 laid in the region of interest 10 is generally comprised between 10 source locations per $km^2$ and 100 source locations per $km^2$. Each source location can comprise one or more source 30.

The determined minimal surface density of receivers 32 laid in the region of interest is comprised for example between 10 probes per $km^2$ and 1000 probes per $km^2$, in particular between 300 probes per $km^2$ and 500 probes per $km^2$, notably 400 probes per $km^2$.

In a variant, the minimal surface density of sources 30 and/or the minimal surface density of receivers 32 is/are determined by a correlation with a dimension of the terrain, based for example on the expected depth of the target.

The method according to the invention further comprises a step 205 for determining a first set of locations of a plurality of sources 30 based on the determined minimal surface density of sources over the region of interest 10.

The method according to the invention further comprises a step 210 for determining a first set of locations of a plurality of receivers 32 based on the determined minimal surface density of receivers over the region of interest 10.

In a first round, the locations of the plurality of sources 30 are spread in the region of interest 10. The locations are determined based on their accessibility from the base camps 34.

Typically, the locations of the plurality of sources 30 are determined so as to ensure radio communication with at least one base camp 34 of the region of interest 10.

For example the locations of the sources 30 have to be located at a distance less than the maximal characteristic distance from a base camp 34.

The locations of the plurality of receivers 32 are also spread in the region of interest 10.

They are for example located at a distance less than a characteristic flying distance from a base camp.

The first set of locations of the plurality of the sources 30 and of the plurality of the receivers 32 defines a first seismic acquisition survey.

Advantageously, the method comprises delimiting at least one forbidden zone of the area of interest 10 in which no receivers 32 are installed. For example, the forbidden zone comprises a village, a protected zone and/or a zone having HSE risks.

The method according to the invention further comprises a step 220 for generating a first synthetic seismic dataset based on the first seismic survey acquisition geometry and an a priori model of the region of interest 10.

The a priori model includes for example geological information such as the location of geological structures, e.g. faults, and/or geological lithologies.

The location of geological structures and/or geological lithologies may be determined also for example by additional geophysical surveys such as electromagnetic surveys or gravity surveys.

In addition, the location of geological structures and/or geological lithologies is determined from field observations.

The a priori model further includes subsurface physical properties such as density, P wave velocities $V_P$, S wave velocities $V_S$ of the layers of geological formations 22 and corresponding quality factor $Q_P$ and $Q_S$.

Typically, the a priori model may comprise anisotropy of the subsurface physical properties.

The subsurface physical properties are for example determined from modelling of additional geophysical surveys and/or from laboratory measurements on field samples of rocks from the layers of geological formations 22.

The subsurface physical properties may also be determined through an empirical and/or theoretical relationship between the subsurface physical properties, such as relationships between seismic velocities and stress and/or depth.

For example, $V_S$ is determined from $V_P$ or alternatively, $V_P$ is determined from $V_S$ through the Poisson's relationship:

$$\left(\frac{V_P}{V_S}\right)^2 = \frac{2(1-v)}{1-2v}$$

with v the Poisson's ratio.

For example, the density is determined from Gardner's relation:

$$\rho = \alpha V_P^\beta$$

with $\alpha$ and $\beta$ are empirically derived constants depending on the geology.

The first synthetic seismic dataset is for example generated with a three-dimension or a two-dimension forward numerical modeling of seismic data.

For example, the first synthetic seismic dataset is generated by ray tracing or wave equation methods known from the prior art.

Advantageously, the forward modeling method is chosen as a tradeoff between the necessary accuracy and the desired computing time.

The method according to the invention further comprises a step 225 for processing the first synthetic seismic dataset for obtaining a first simulated image of the subsurface of the region of interest 10 using a seismic imaging algorithm.

Advantageously, the imaging algorithm is an illumination algorithm or a 3D seismic inversion and migration algorithm.

The imaging algorithm is for example a deterministic or a stochastic inversion imaging algorithm.

Inversion and migration algorithms details may for example be found in "*Fundamental of Geophysical Data Processing*", Claerbout, Stanford University, 1976, Mc Graw-Hill, "*Imaging the Earth's interior*", Claerbout, Stanford University, 1984, Blackwell Scientific Publications or "*Seismic Migration (1st edition), Imaging of Acoustic Energy by Wave Field extrapolation*", Berkhout, 1980, Elsevier.

Illumination algorithm details in "3*D Seismic Survey Design*", G. L. O. Vermeer, Geophysical References Series No 12, SEG, 2002 ($1^{st}$ edition), 2003 ($2^{nd}$ edition).

The method according to the invention further comprises a step 230 for calculating a first objective function. The first objective function is dependent of a first quality index of the first simulated image of the subsurface of the region of interest 10.

For example, the first quality index is based for example on the calculation and the analysis of seismic attributes such as coherency, and/or the analysis of signal-to-noise ratio.

If the imaging algorithm is an illumination algorithm, the first quality index may be based typically on the illumination density (map of illumination).

In a variant, the first quality index may be based on the determined solid angle at a location of the subsurface. The wider is the solid angle, the better is the ability to estimate the physical property at the location.

Advantageously, the objective function is further dependent of at least one characteristic index of the seismic survey acquisition geometry.

For example the characteristic index is dependent on one or more of the following parameters: a time for establishing the seismic survey acquisition geometry, a total traveled distance for establishing the seismic survey acquisition geometry, a mileage of opened trails for establishing the seismic survey acquisition geometry, a volume of cut wood for establishing the seismic survey acquisition geometry, a man-hour quantity for establishing the seismic survey acquisition geometry, a fuel consumption quantity for establishing the seismic survey acquisition geometry, a mileage of bridging for improving the accessibility of the region of interest 10, a number of helicopter hours for establishing the seismic survey acquisition geometry, a generated $CO_2$ quantity for establishing the seismic survey acquisition geometry, a total time for installing the sources 30 and the receivers 32 in the area of interest 10.

Typically, the total time for installing the sources 30 and the receivers 32 in the area of interest 10 depends on the sequence of operations and is dependent on at least another characteristic index.

In a variant, the sequence of operations may also be directly a constraint in the objective function. For example, the constraint provided by the sequence of operations comprises generating seismic signal with a first set of sources 30 located in a first zone of the area of interest 10 prior to generate seismic signal with a second set of sources 30 in a second zone of the area of interest 10.

In a variant, the optimal tracks to travel in the region of interest 10 are first determined as mentioned above and the characteristic index is the length of optimal tracks of each order.

Typically, the characteristic indexes may be multi-dependent.

Typically, some characteristic indexes are dependent of the weather conditions and of the time of year.

The first objective function may be of the type:

$$OF(X_{S1}, Y_{S1}, X_{R1}, Y_{R1}) = W_{QI1} \cdot QI_1(X_{S1}, Y_{S1}, X_{R1}, Y_{R1}) + \Sigma W_{CI_i} CI_i$$

where $QI_1$ is the first quality index of the image, $CI_i$ are various characteristic indexes as defined above, $W_{QI1}$ and $W_{CI_i}$ are weight coefficients advantageously ranging from 0 to 1 depending on the situation, and $X_{S1}$, $Y_{S1}$, $X_{R1}$, $Y_{R1}$ are respectively the coordinates of the first set of the plurality of sources 30 and the coordinates of the first set of the plurality of receivers 32.

Typically, the first objective function may include a limited number of characteristic indexes.

In a variant, a plurality of characteristic indexes may be replaced by another index.

The method further comprises steps 235 and 240 for respectively determining a second set of locations of a plurality of sources 30 based on the determined minimal surface density of sources 30, and determining a second set of locations of a plurality of receivers 32 based on the determined minimal surface density of receivers 32.

Advantageously, the locations of the second set of plurality of sources 30 are obtained by changing the location of at least one source 30 of the first set of locations of the plurality of sources 30, and advantageously by keeping the location of at least one source 30 of the first set of locations of sources 30.

Advantageously, the number of locations of sources 30 in the first set is equal to the number of location of sources 30 in the second set. Similarly the number of locations of receivers 32 in the first set of receivers 32 is equal to the number of receivers 32 in the second set.

In a variant, the number of sources 30 and/or the number of receivers 32 is increased or decreased from the first set to the second set.

Preferentially, the locations of more than 50% of the sources 30 and/or of the receivers 32 remain unchanged in the first set and in the second set, to allow a local optimization of the source 30 locations.

The method then comprises a step 245 for generating a second synthetic seismic dataset based on the second set of locations of the sources 30 and of the receivers 32, a step 250 for processing the second synthetic dataset for obtaining a second simulated image of the subsurface and a step 255 for calculating a second objective function. The second objective function is dependent of at least a second quality index of the second simulated image.

Steps 245, 250 and 255 are implemented similarly to what has been described above for the first set of locations of the plurality of sources 30 and the first set of locations of the plurality of receivers 32.

Then, the method comprises a step 260 of comparing the first objective function and the second objective function.

The method comprises a step 265 for determining an optimal set of locations of the sources 30 and an optimal set of locations of the receivers 32 among respectively the first and the second sets of locations of the plurality of the sources 30 and of the receivers 32, based on repeating steps 235 to 260 and on the comparison of the successive objective functions.

Typically, the optimal location of the sources 30 and the optimal location of the receivers 32 are chosen so as to maximize the quality index of the simulated image of the subsurface of the region of interest.

In addition, the optimal location of the sources 30 and the optimal location of the receivers 32 are chosen to minimize or maximize at least one characteristic index, depending on the characteristic index, so as to minimize the risks relative to health and safety of the operators and limit impact on the environment.

For example, by reducing the time for establishing the seismic survey or the total traveled distance for establishing the seismic survey or a mileage of bridging, the risk of accidents for the operators is reduced.

For example, the number of operators required is also reduced, lowering the risk of accidents.

For example, by reducing the mileage of opened trails for establishing the seismic survey or the volume of cut wood for establishing the survey or the fuel consumption quantity for establishing the geophysical survey, the impact on the environment is reduced.

Step 265 of determination of the optimal locations of the sources 30 and of the optimal locations of the receivers 32 is for example implemented using an optimization algorithm.

For example, the optimization algorithm is a nonlinear algorithm.

Advantageously, the optimization algorithm is a global optimization algorithm.

The optimization algorithm is robust and is adapted to determine global optimal locations of the sources 30 and the optimal location of the receivers 32, avoiding local minima.

For example, the optimization algorithm is for example a Brute Force algorithm, a SAT solving algorithm, a constraint programming algorithm or a reinforcement learning algorithm such as Q-learning, value iteration or Bayesian network.

Advantageously, the optimization algorithm is a heuristic or meta-heuristic algorithms based on the previous obtained results and on the similarity to optimize the next results. Typically, this algorithm is used to simplify the optimization problem due to the high number of characteristic indexes to be taken into account. Consequently, the solution may not be the optimal solution but rather an approached solution.

Advantageously, the method includes a step for studying the sensitivity of the determined optimal locations of the sources 30 and of the optimal locations of the receivers 32 to determine the robustness of the determined set of optimal locations.

Advantageously, the method includes setting a set of bounds and/or constraints on the objective function, for example on at least one characteristic index.

For example, the time and/or the fuel consumption quantity, and/or the mileage of cut wood for establishing the seismic survey acquisition geometry is bounded by a maximal corresponding value.

Advantageously, the method further comprises a step 270 for modifying the location of at least one base camp 34 based on the optimal location of sources 30 and/or the optimal location of the receivers 32.

The location of the base camp 34 is adapted to take into account the optimal location of sources 30 and/or the optimal location of the receivers 32 and the constraints as described above.

Steps 235 to 265 and optionally 270 are then repeated until a set of adequate locations for the base camps 34, for the sources 30 and for the receivers 32 is found, with an optimal quality index of the simulated image of the subsurface and with an optimal set of characteristic indexes as defined above. The method is then stopped at step 280.

Typically, steps 235 to 265 and optionally 270 are stopped when the convergence is typically obtained on the locations of the base camp 34 and/or the sources 30 and/or the receivers, for example when the locations of the base camps 34 and/or the sources 30 and/or the receivers 32 do not change of more than 1 m.

Other criteria may be used such as low gradients, objective functions below a minimal threshold.

In a variant, the method is stopped after a predetermined time duration, such as one day.

Once the method according to the invention has been carried out, the sources 30 and the receivers 32 are put in place according to an optimal master plan.

In a variant, the method comprises establishing a sequence of operations for carrying the sources 30 and/or the receivers 32 at their optimal locations during and/or after the step of determination of optimal locations is completed.

Advantageously, the method then comprises optimizing the sequence of operations to minimize at least one characteristic index of the survey, preferably a plurality of characteristic indexes of the survey.

The output of the method then includes not only the locations of the base camps 34, sources 30 and receivers 32, but also an order of installation of the sources 30 and receivers 32, as well as an optimal set up plan for installing the sources 30 and receivers 32, including for example tracks locations, installation sequences, etc. . . . . The time length of the survey and its cost can also be calculated and planned.

The method advantageously comprises displaying on a displaying unit the corresponding sequence of logistical operations. This allows a visual control of the integrity of the logistical operations.

In another variant, the method according to the invention may be implemented at least one more time during the set-up of the survey so as to update the optimal locations of the sources 30 and the receivers 32 to take into account field constraints for example In the example of FIG. 2, the method comprises installing the receivers 32 in the region of interest using UAV.

In a variant or in addition, the method may comprise delimiting at least one zone of the area of interest 10 in which receivers 32 are placed using at least one alternative technique such as by hand, or using a UGV. For example, the zone is for example a wet area or a rocky screes area.

In a variant, the method comprises fixing the various characteristic indexes of the objective function based on field constraints and determining the optimal set of locations of sources 30 and/or the optimal set of locations of receivers 32 such as to maximize the quality index of the simulated image of the subsurface.

Typically, other types of receivers 32 may be used in these areas, such as a hydrophone in the wet area.

Figure 5:
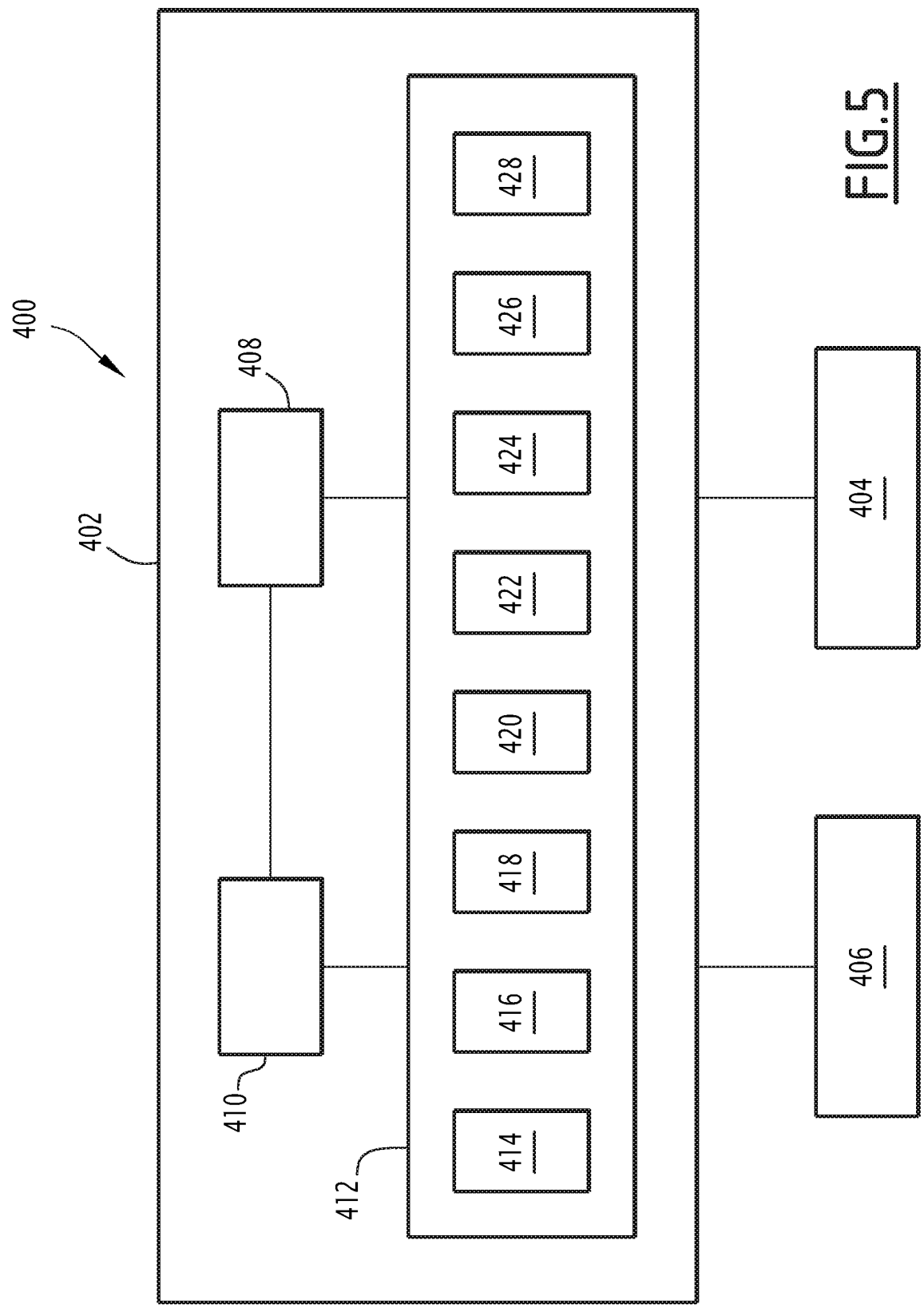
FIG. 5 is a schematic representation of a system for evaluating a seismic survey acquisition geometry over a region of interest, according to the invention.

FIG. 5 schematically illustrates a system 400 for evaluating a seismic survey acquisition geometry over a region of interest 10, according to the invention.

The system 400 comprises a calculator 402 for evaluating the seismic survey acquisition geometry, a display unit 404 connected to the calculator 402 to display the results provided by the calculator 402 and a man-machine interface 406.

The calculator 402 comprises a database 408. The database 408 is able to store the results provided by the calculator 402.

The calculator 402 comprises a processor 410 and a memory 412 receiving software modules. The processor 410 is able to execute the software modules to carry out the method according to the invention.

The memory 412 contains a base camp location calculating module 414 for determining the location of a plurality of base camps 34 on the region of interest 10.

The memory 412 further comprises a source location calculating module 416 for determining the location of a plurality of sources 30 in respect of the determined minimal surface density of sources 30 over the region of interest 10.

The memory 412 also contains a receiver location calculating module 418 for determining the location of a plurality of receivers 32 in respect of the determined minimal surface density of receivers 32 over the region of interest 10.

The memory 412 includes a computation module 420 for generating the synthetic seismic dataset based on the seismic survey acquisition geometry and an a priori subsurface model of the region of interest 10.

The memory 412 further includes an imaging module 422 for processing the synthetic seismic dataset for obtaining a simulated image of the subsurface of the region of interest using an imaging algorithm.

The memory 412 includes an objective function calculation module 424 for calculating an objective function.

Advantageously, the memory 412 further comprises a comparison module 426 for comparing the first objective function resulting from a first seismic survey acquisition geometry and a second objective function resulting from a second seismic survey acquisition geometry.

Advantageously, the memory 412 contains an optimization module 428 for determining the optimal set of locations of sources 30 and the optimal set of locations of receivers 32 among respectively the first set of locations of the plurality of sources 30 of the first seismic survey acquisition geometry and the set of locations of the second plurality of sources 30 of the second seismic survey acquisition geometry, and the first set of locations of the plurality of receivers 32 of the first seismic survey acquisition geometry and the second set of locations of the plurality of receivers 32 of the second seismic survey acquisition geometry, by comparing the first and the second objective functions.

In another embodiment of the method according to the invention, the geophysical survey is a magnetotelluric (MT) survey.

The receivers 32 are then magnetotelluric sensors and are comprised of magnetometers to measure the natural geomagnetic field variations and of electrodes to measure the geoelectric field variation on the surface of the region of interest 10.

The method then typically comprises processing at step 225 the MT datasets for obtaining an image reflecting the electrical conductivity variations of the subsurface of the region of interest 10 using a MT inversion algorithm.

In another embodiment of the method according to the invention, the geophysical survey is a passive seismic survey.

The receivers 32 are then at least one geophone to measure the ground vibrations induced by ambient seismic noise.

The method typically comprises processing 225 the datasets for obtaining an image reflecting the S-waves and/or P-waves velocities variations of the subsurface of the region of interest 10 using a passive seismic inversion algorithm.

The method for evaluating a geophysical survey acquisition geometry over a region of interest 10 according to the invention is particularly advantageous because it allows optimizing both the quality of the expected geophysical survey and the health, safety and environment constraints.

Moreover, in an embodiment wherein an illumination algorithm is used as seismic imaging algorithm, the method allows a fast determination of the optimal geophysical survey acquisition geometry over the region of interest.

In a variant, the second set of locations of the plurality of receivers 32 is obtained by changing the location of at least one receiver 32 of the first set of locations of the plurality of receivers 32, and advantageously by keeping the location of at least one receiver 32 of the first set of locations of the plurality of receivers 32.

The invention claimed is:

1. A method for evaluating a geophysical survey acquisition geometry over a region of interest, said acquisition geometry specifying at least a location of a plurality of receivers, said method being carried out with a system for evaluating a geophysical survey acquisition geometry over a region of interest, said method comprising:
   determining a location of a plurality of base camps in respect of a determined minimal surface density of base camps over the region of interest,
   determining a first set of locations of a plurality of receivers in respect of a determined minimal surface density of receivers over the region of interest,
   generating a first synthetic geophysical dataset based on the first geophysical survey acquisition geometry,
   processing the first synthetic geophysical dataset for obtaining a first simulated image of the subsurface of the region of interest using a geophysical processing algorithm and an a priori subsurface model of the region of interest, and
   calculating a first objective function, said first objective function being dependent of at least a first quality index of the first simulated image of the subsurface of the region of interest.

2. The method according to claim 1, further comprising:
   determining a second set of location of a plurality of receivers in respect of the determined minimal surface density of receivers over the region of interest,
   generating a second synthetic geophysical dataset based on the second geophysical survey acquisition geometry
   processing the second synthetic geophysical dataset for obtaining a second simulated image of the subsurface of the region of interest using the geophysical processing algorithm and an a priori subsurface model of the region of interest,
   calculating a second objective function, said second objective function being dependent of at least a second quality index of the second simulated image of the subsurface of the region of interest,
   comparing the first objective function and the second objective function, and
   determining an optimal set of locations of the receivers among the first set and the second set of locations of the receivers based on the comparison of the first and the second objective function.

3. The method according to claim 2, wherein the second set of locations of the plurality of receivers is obtained by changing the location of at least one receiver of the first set of locations of the plurality of receivers, and advantageously by keeping the location of at least one receiver of the first set of locations of the plurality of receivers.

4. The method according to claim 2, further comprising determining an optimal sequence of logistical operations to install the receivers at the optimal set of locations and advantageously displaying on a displaying unit the corresponding sequence of logistical operations.

5. The method according to claim 1, in which the objective function is further dependent of at least one characteristic index of the geophysical survey acquisition geometry.

6. The method according to claim 5, in which the at least one characteristic index is calculated from at least one parameter among: a time for establishing the geophysical survey acquisition geometry, a total traveled distance for establishing the geophysical survey acquisition geometry, a mileage of opened trails for establishing the geophysical survey acquisition geometry, a volume of cut wood for establishing the geophysical survey acquisition geometry, a man-hour quantity for establishing the geophysical survey acquisition geometry, a fuel consumption quantity for establishing the geophysical survey acquisition geometry, a mileage of bridging for improving the accessibility of the region of interest, a number of helicopter hours for establishing the geophysical survey acquisition geometry, a generated $CO_2$ quantity for establishing the geophysical survey acquisition geometry, a total time for installing the receivers in the area of interest.

7. The method according to claim 1, further comprising modifying the location of at least one base camp based on at least the optimal location of the receivers.

8. The method according to claim 1, further comprising initially determining the determined minimal surface density of receivers based on a priori model modelling.

9. The method according to claim 1, in which the determination of the location of the plurality of base camps on the region of interest is based on a maximal characteristic distance traveled by a team of operators in a given time, the maximal characteristic distance being advantageously calculated from at least one field parameter of the region of interest chosen among: a topography, a vegetation density index, a vegetation nature index, a hydrographic network, a tracks location.

10. The method according to claim 1, in which the location of the plurality of receivers is calculated based on at least one field parameter of the region of interest, the field parameter being advantageously the vegetation density index and/or the vegetation nature index, and the location of the receivers is calculated in areas having locally a low and/or a null vegetation density index, and/or in areas having a predetermined vegetation nature index.

11. The method according to any one of claim 10, in which at least one field parameter is determined from satellite and/or airborne measurements of the region of interest.

12. The method according to claim 1, in which the geophysical survey is a seismic survey, the acquisition geometry further specifying a location of a plurality of sources, the first and/or the second synthetic geophysical datasets being respectively a first and/or a second synthetic seismic datasets, the processing geophysical algorithm being a seismic imaging algorithm, the method further comprising after the step for determining the location of the plurality of base camps:

determining a first set of locations of a plurality of sources in respect of a determined minimal surface density of sources over the region of interest, the location of the sources being reachable on the ground from at least one base camp.

13. The method according to claim 12, further comprising:

determining a second set of location of a plurality of receivers in respect of the determined minimal surface density of receivers over the region of interest, generating a second synthetic geophysical dataset based on the second geophysical survey acquisition geometry processing the second synthetic geophysical dataset for obtaining a second simulated image of the subsurface of the region of interest using the geophysical processing algorithm and an a priori subsurface model of the region of interest, calculating a second objective function, said second objective function being dependent of at least a second quality index of the second simulated image of the subsurface of the region of interest, comparing the first objective function and the second objective function, determining an optimal set of locations of the receivers among the first set and the second set of locations of the receivers based on the comparison of the first and the second objective function, and further comprising, before determining the second set of location of a plurality of receivers:

determining a second set of locations of a plurality of sources in respect of the determined minimal surface density of sources over the region of interest, the location of the sources being reachable from at least one base camp, the determining of the second set of locations further comprising determining an optimal set of locations of the sources.

14. The method according to claim 13, wherein the second set of locations of the plurality of sources is obtained by changing the location of at least one source of the first set of locations of the plurality of sources, and advantageously by keeping the location of at least one source of the first set of locations of the plurality of sources.

15. The method according to claim 12, in which the seismic imaging algorithm is an illumination algorithm or a 3D seismic inversion and migration algorithm.

16. The method according to claim 12, further comprising an initial determining of the determined minimal surface density of sources and/or of the determined minimal surface density of receivers based on a priori model modelling, the a priori model modelling being advantageously obtained with an illumination algorithm.

17. A process for carrying out a seismic survey over a region of interest comprising:

carrying out a method according to claim 12 to determine the location of a plurality of sources and the location of a plurality of receivers in the region of interest, based on the objective function, transporting the sources and the receivers to the base camps by at least a vehicle, carrying the sources at their determined locations, advantageously without a ground vehicle, and setting up the sources, transporting the receivers at their determined locations, in particular with a plurality of airborne platforms, the method advantageously comprising dropping the receivers in the ground from the airborne platforms.

18. System for evaluating a geophysical survey acquisition geometry over a region of interest, said acquisition geometry specifying at least a location of a plurality of receivers, said system comprising:

a base camp location calculating module for determining a location of a plurality of base camps on the region of interest, a receiver location calculating module for determining a first set of locations of a plurality of receivers in respect of a minimal surface density of receivers over the region of interest, a computation module for generating a synthetic geophysical dataset based on the geophysical survey acquisition geometry and an a priori subsurface model of the region of interest, an imaging module for processing the synthetic geophysical dataset for obtaining a simulated image of the subsurface of the region of interest using a geophysical processing algorithm, and an objective function calculation module for calculating an objective function, said objective function being dependent of at least a quality index of the simulated image of the subsurface of the region of interest.

19. The system according to claim 18, further comprising:

a comparison module for comparing a first objective function resulting from a first geophysical survey acquisition geometry and a second objective function resulting from a second geophysical survey acquisition geometry, and an optimization module for determining an optimal set of locations of receivers among a first set of locations of a plurality of receivers of the first seismic survey acquisition geometry and a second set of locations of a plurality of receivers of the second seismic survey acquisition geometry, said optimal set of locations being based on the comparison of the first and the second objective function.

20. The system according to claim 18, further comprising a source location calculating module for determining a first set of locations of a plurality of sources in respect of a minimal surface density of sources over the region of interest, the location of the sources being reachable from at least one base camp, the geophysical survey being a seismic survey, the acquisition geometry further specifying a location of a plurality of sources, the synthetic geophysical dataset being a synthetic seismic dataset, the processing geophysical algorithm being a seismic imaging algorithm.

21. The system according to claim 20, further comprising:

a comparison module for comparing a first objective function resulting from a first geophysical survey acquisition geometry and a second objective function resulting from a second geophysical survey acquisition geometry, an optimization module for determining an optimal set of locations of receivers among a first set of locations of a plurality of receivers of the first seismic survey acquisition geometry and a second set of locations of a plurality of receivers of the second seismic survey acquisition geometry, said optimal set of locations being based on the comparison of the first and the second objective function;

in which the optimization module further determines an optimal set of locations of sources among a first set of locations of a plurality of sources of the first seismic survey acquisition geometry and at least a second set of locations of a plurality of sources of the second seismic survey acquisition geometry.

22. A computer program product comprising software instructions which, when executed by a computer, carry out the method according to claim 1.

* * * * *